(12) United States Patent
Ahmad et al.

(10) Patent No.: US 9,745,852 B2
(45) Date of Patent: Aug. 29, 2017

(54) AXIAL ROTOR PORTION AND TURBINE ROTOR BLADE FOR A GAS TURBINE

(71) Applicant: Siemens Aktiengesellschaft, Munich (DE)

(72) Inventors: Fathi Ahmad, Kaarst (DE); Nihal Kurt, Dusseldorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 326 days.

(21) Appl. No.: 14/398,464

(22) PCT Filed: Apr. 15, 2013

(86) PCT No.: PCT/EP2013/057753
§ 371 (c)(1),
(2) Date: Nov. 2, 2014

(87) PCT Pub. No.: WO2013/167346
PCT Pub. Date: Nov. 14, 2013

(65) Prior Publication Data
US 2015/0086361 A1    Mar. 26, 2015

(30) Foreign Application Priority Data
May 8, 2012 (DE) .................. 10 2012 207 622

(51) Int. Cl.
*F01D 5/18* (2006.01)
*F01D 5/08* (2006.01)
*F01D 5/30* (2006.01)

(52) U.S. Cl.
CPC ............... *F01D 5/18* (2013.01); *F01D 5/30* (2013.01); *F01D 5/3015* (2013.01); *F01D 5/082* (2013.01);
(Continued)

(58) Field of Classification Search
CPC . F01D 5/18; F01D 5/30; F01D 5/3015; F01D 5/082; F05B 2260/201; F05D 2260/201; Y02T 50/676
See application file for complete search history.

(56) References Cited

U.S. PATENT DOCUMENTS 3,572,966 A * 3/1971 Borden ................. F01D 5/3015
                                                      415/115
3,814,539 A    6/1974 Klompas
(Continued)

FOREIGN PATENT DOCUMENTS

CN         1611747 A      5/2005
CN       102203389 A      9/2011
(Continued)

OTHER PUBLICATIONS

RU Office Action dated Apr. 18, 2017, for RU patent application No. 2014149236.

*Primary Examiner* — Nathaniel Wiehe
*Assistant Examiner* — Zubair Eltaf
(74) *Attorney, Agent, or Firm* — Beusse Wolter Sanks & Maire

(57) ABSTRACT

A turbine rotor blade is provided with a blade root, platform adjoining it, and turbine blade on that side of the platform which faces away from the blade root, with at least one opening for feeding coolant into the turbine rotor blade interior on an underside of the blade root, which opening merges into a coolant duct. An axial rotor section for a rotor is provided, having an outer circumferential surface adjoining two end-side first side surfaces with rotor blade holding grooves distributed over the circumference and extending along an axial direction, wherein a turbine rotor blade is arranged in every holding groove, wherein a multiplicity of sealing elements are at the side of a side surface of the rotor section, and lie opposite the end sides of blade roots to form (Continued)

a gap. Multiple outlet holes for impingement cooling of the sealing elements are provided in the end surface.

6 Claims, 3 Drawing Sheets

(52) U.S. Cl.
CPC .. *F05B 2260/201* (2013.01); *F05D 2260/201* (2013.01); *Y02T 50/676* (2013.01)

(56) References Cited

U.S. PATENT DOCUMENTS

| | | | |
|---|---|---|---|
| 3,834,831 A * | 9/1974 | Mitchell | F01D 5/081 416/193 A |
| 4,093,399 A | 6/1978 | Glenn | |
| 4,439,107 A | 3/1984 | Antonellis | |
| 6,402,471 B1 | 6/2002 | Demers et al. | |
| 6,984,112 B2 | 1/2006 | Zhang et al. | |
| 8,439,627 B2 | 5/2013 | Inomata et al. | |
| 8,529,194 B2 | 9/2013 | Ammann et al. | |
| 8,573,943 B2 | 11/2013 | Bilstein et al. | |
| 2005/0232751 A1 | 10/2005 | Townes et al. | |
| 2006/0088416 A1 | 4/2006 | Boury | |
| 2009/0232660 A1 | 9/2009 | Liang | |
| 2010/0178155 A1 | 7/2010 | Inomata et al. | |
| 2011/0027092 A1 | 2/2011 | Engle | |
| 2012/0036864 A1 | 2/2012 | Riazantsev et al. | |
| 2012/0070305 A1 | 3/2012 | Ammann et al. | |
| 2013/0156598 A1 | 6/2013 | Davis | |

FOREIGN PATENT DOCUMENTS

| | | |
|---|---|---|
| EP | 1205634 A2 | 5/2002 |
| EP | 1978211 A1 | 10/2008 |
| EP | 2208859 A2 | 7/2010 |
| EP | 2388435 | 11/2011 |
| EP | 2388435 A2 | 11/2011 |
| EP | 2418352 A2 | 2/2012 |
| EP | 2423435 A1 | 2/2012 |
| GB | 2409240 A | 6/2005 |
| JP | S48025686 B1 | 7/1973 |
| JP | S5654904 A | 5/1981 |
| JP | S57162903 A | 10/1982 |
| JP | S5865903 A | 4/1983 |
| JP | 2011241827 A | 12/2011 |
| RU | 2241834 C2 | 12/2004 |
| UA | 57357 C2 | 2/2005 |
| WO | 2010139766 A1 | 12/2010 |

* cited by examiner

AXIAL ROTOR PORTION AND TURBINE ROTOR BLADE FOR A GAS TURBINE

CROSS REFERENCE TO RELATED APPLICATIONS

This application is the US National Stage of International Application No. PCT/EP2013/057753 filed Apr. 15, 2013, and claims the benefit thereof. The International Application claims the benefit of German Application No. DE 102012207622.0 filed May 8, 2012. All of the applications are incorporated by reference herein in their entirety.

FIELD OF INVENTION

The invention relates to an axial rotor portion for a rotor of a gas turbine, having an outer circumferential surface which adjoins two first side surfaces at the end and in which rotor blade retainer grooves distributed over the circumference and extending along an axial direction are provided for rotor blades of the turbine. The invention also relates to a turbine rotor blade having a blade root, an adjoining platform and a main blade part located on that side of the platform which is remote from the root, wherein at least one opening for feeding a coolant into the interior of the turbine rotor blade is provided in the blade root and merges into a coolant duct.

BACKGROUND OF INVENTION

An axial rotor portion of the generic type for a turbine is known, for example, from laid-open specification DE 1 963 364 A1. The rotor portion, which is formed by a rotor disk, is equipped with retainer grooves running in the axial direction for rotor blades of the turbine, with an endlessly encompassing locating groove for sealing plates being provided on the end face. The sealing plates which sit therein block displacement of the rotor blades along the retainer grooves and thereby fix the latter. Each sealing plate is in this case secured against loss by a screw.

The sealing plates moreover form a sealing ring, as viewed in the circumferential direction. The sealing ring separates a first space between the sealing plate and the end face of the rotor disk from a second space located on the other side of the sealing plate. During operation, cooling air flows through the first space, preventing thermal overloading of the blade root and of the outer rim of the rotor disk.

A disadvantage of the known apparatus is the use of a screw for securing the sealing plates against displacement in the circumferential direction. On account of the alternating thermal loading which occurs between operation and stationary state and on account of the hot gas which flows through the turbine, problems relating to corrosion and strength in the screw fastening can arise. Under certain circumstances, these cannot be resolved in a specified manner. In this case, the screw is drilled out, this operation being carried out as a rule on the rotor which still lies in the lower housing half of the gas turbine. It may be the case that swarf falls into the lower housing half in the process, which can bring about undesirable contamination during subsequent operation.

Furthermore, FR 2 524 933 discloses securing rotor blades against axial displacement, these rotor blades being retained by means of a plate which is displaceable in the circumferential direction. The arrangement which is shown therein is not suitable, however, for sealing off a space close to the disk in relation to a space present on the other side of the plate. There is therefore the risk here of thermally-induced damage to the blade root and rotor disk rim.

Furthermore, laid-open specification DE 30 33 768 A1 discloses a rotor sub-assembly for a rotor disk of a turbine which has a single-piece sealing ring for axially securing rotor blades. On account of the fact that the sealing ring has a single-piece construction, it is only suitable, however, for aircraft gas turbines, since these are assembled by alternately stacking rotor and stator components in the axial direction. Stationary gas turbines, by contrast, are assembled from two housing halves which encompass the completely installed rotor. The single-piece sealing ring in DE 30 33 768 A1 is hooked to the turbine disk in the manner of a bayonet connection.

Furthermore, US 2004/0081556 A1 discloses a gas turbine blade of the generic type having a blade root, a platform and a main blade part. The platform extends from a leading edge to a trailing edge, with respect to the hot gas which flows through the gas turbine in the axial direction. The platform has a trailing edge which runs in the circumferential direction of the turbine disk and which protrudes beyond the axial width of the turbine disk in the manner of an eave. A plurality of structural elements which influence the cooling-air flow are provided on the underside of the trailing edge of the platform.

With an increasing advance in technology and new demands on the performance and service life of gas turbines, there is the need to provide new designs which, in spite of technically more demanding boundary conditions, continue to have the desired service life.

SUMMARY OF INVENTION

It is an object of the invention therefore to provide a turbine rotor blade and an axial rotor portion with which the aforementioned demands can be satisfied.

The object directed to the turbine rotor blade is achieved by a turbine rotor blade as per the features of the independent claims.

According to aspects of the invention, it is provided that a number of outlet holes for cooling adjacent components are provided in the end face of the blade root and open into the respective coolant duct.

The invention is based on the knowledge that the blade root of the turbine rotor blade can also be used for purposes other than supporting the platform and the adjoining main blade part. Now, the blade root of the turbine rotor blade is configured in such a way that it becomes part of a cooling arrangement, in which case the component to be cooled does not belong to the turbine rotor blade, but rather is a sealing element, these being adjacent to one another in the installed state. On the one hand, the sealing element axially fixes the respective turbine rotor blade in the rotor blade retainer groove, and on the other hand it directs a coolant close to the surface on a side surface of an axial rotor portion and on the end face of the blade root. At the same time, this stream of coolant which is directed past to date also cooled the sealing element.

Through the use of a turbine rotor blade according to aspects of the invention, it is now possible to depart from the convective cooling of the sealing element and to establish for this purpose impact cooling with the aid of a particularly simple design. It is particularly advantageous that it is possible to dispense with an impact cooling element fastened in a complicated manner. Instead of this, a supply duct, the coolant duct, is provided for the impact coolant in the interior of the blade root and advantageously extends comparatively closely beneath the end surface of the blade root. In relation to the orientation in a gas turbine, the coolant duct extends in the radial direction. At the same time, a number of holes which open into the coolant duct are provided in the end surface of the blade root. The coolant flowing into the coolant duct can then emerge in the form of a jet through the holes, what are termed the outlet holes, on the end face of the blade root, after which said coolant then impacts on the surface of the sealing element facing toward the end face of the blade root. The sealing element is thereby cooled more effectively than to date. At the same time, it is possible to achieve more efficient thermal shielding of the blade root and of the outer rim of the rotor portion or of a rotor disk. This brings about an increase in service life in the case of unchanged operating conditions or makes it possible to achieve a service life similar to that to date in the case of more difficult operating conditions, i.e. higher local operating temperatures.

In this respect, the longitudinal axes of the outlet holes can be at any required angle in relation to the longitudinal extent of the blade root or of the rotor blade retainer groove in order to subject the largest possible area of the sealing element to impact cooling.

A further advantage is the enhanced sealing action in the blade system, since less cooling air flows along the side surface of the rotor portion on account of the impact cooling jets. If sealing elements are provided on the axial rotor portion of the gas turbine on both end faces of the blade root, it is likewise beneficial to use the apparatus according to the invention with coolant ducts and outlet holes arranged on the end face on both end faces of the blade root.

Both the coolant duct and the outlet holes arranged on the end face can be concomitantly produced directly during the casting of the blade root or of the turbine rotor blade. Alternatively, it is also possible to introduce them into the usually cast turbine rotor blade. The coolant duct and/or the outlet holes can be introduced, for example, with the aid of laser drilling or by erosion. In this case, it is expedient that the outlet holes are distributed areally in a uniform grid. Other production processes, for example the fastening of an impact cooling plate over a coolant duct groove on the end face, are likewise conceivable.

An object directed to the axial rotor portion is achieved by the features of the claims. In a similar manner to the turbine rotor blade, outlet holes for the impact cooling of the sealing elements are provided in the axial rotor portion at the regions of at least one side surface which are arranged between the retainer grooves.

In this respect, the same advantages similarly arise as for the use of the turbine rotor blade according to aspects of the invention.

Advantageous configurations are indicated in the respective dependent claims, the features of which can be combined with one another as desired.

In order to observe a defined distance between the respective end face of the blade root of the turbine rotor blade and the sealing element, at least one spacer can be provided on the respective end face.

Since in most cases coolant is provided for the turbine rotor blade on the underside of the blade root, it is advantageous if the opening of the coolant duct is arranged on the underside of the blade root and an element which generates a pressure loss for the coolant or a sealing element is arranged on the underside of the blade root between the opening and the end face of the blade root assigned thereto. With the aid of an element of this type, the pressure gradient can be set in such a way that the coolant flows into the coolant duct and flows out through the outlet holes.

However, these elements do not necessarily have to be formed in one piece with the rotor blade or with the axial rotor portion. They can also be formed as a separately produced seal or flow barrier.

In order to bring about particularly uniform cooling of all the sealing elements of a sealing element ring of an axial rotor portion, as viewed along the circumference, it is recommended to use the turbine rotor blade according to the invention in an axial rotor portion according to the invention.

BRIEF DESCRIPTION OF THE DRAWINGS

Further advantages and features of the invention will be explained in more detail on the basis of an exemplary embodiment. In the drawing.

DETAILED DESCRIPTION OF INVENTION

In all of the figures, identical features are provided with the same reference signs.

Figure 1:
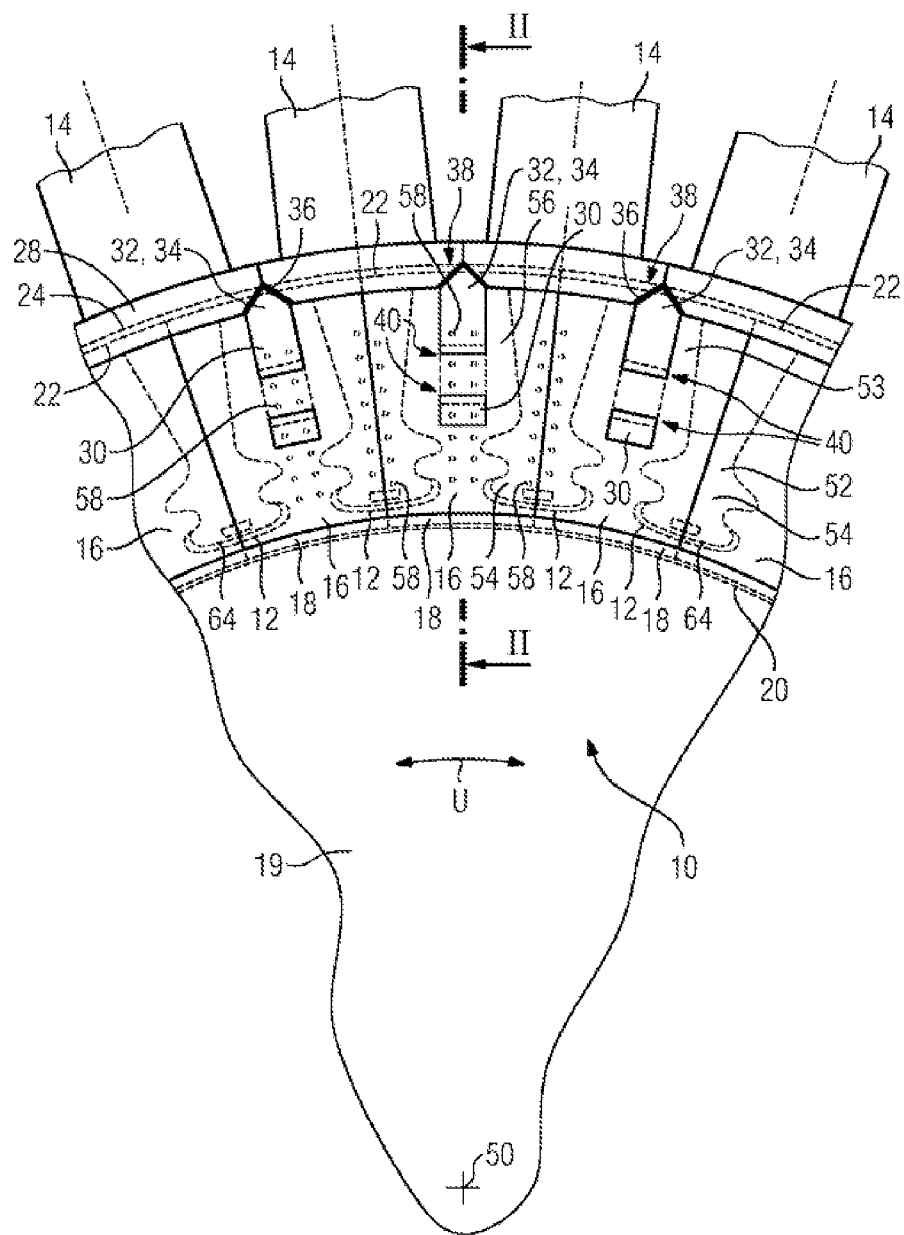
FIG. 1 shows an axial rotor portion with turbine rotor blades arranged on the external circumference.
Figure 2:
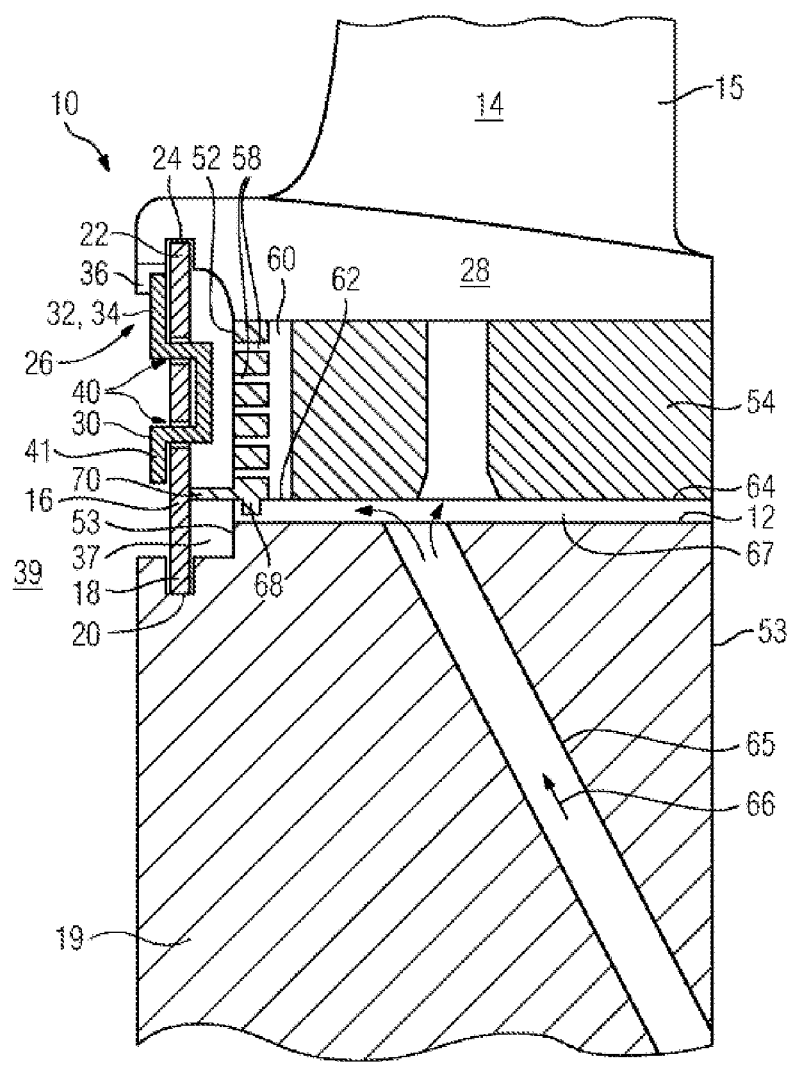
FIG. 2 shows the cross-sectional view as shown in FIG. 1 along the sectional line II-II.

FIG. 1 shows an axial rotor portion 10 in a lateral view and FIG. 2 shows an axial rotor portion 10 in a cross section as per the sectional line II-II shown in FIG. 1. For each turbine rotor blade 14, referred to hereinbelow as rotor blade for short, to be secured against axial displacement within the rotor blade retainer groove 12 thereof, provision is made of two adjacent sealing elements 16, which in each case equally cover the opening on the end face of the respective rotor blade retainer groove 12. Each sealing element 16 sits with its radially inner end 18 in a groove 20 provided on the end face on a rotor disk 19 and with its radially outer end 22 in a securing groove 24, which is provided on the underside 26 of a platform 28 of the rotor blade 14. In order to secure each sealing element 16 against displacement in the circumferential direction U, a radially rectilinear sheet metal strip 30 is fastened to each of them. Each sheet metal strip 30 ends at its radially outer end 32 in a uniformly converging tip 34. Beveled edges 36 are present on the platforms 28 of the rotor blades 14, with in each case two opposing edges 36 of directly adjacent rotor blades 14 forming a pointed recess 38, into which the tip 34 of the sheet metal strip 30 can protrude and bear to secure the sealing element 16 against displacement in the circumferential direction U.

The sealing elements 16 moreover ensure the separation of two spaces 37, 39, in which firstly coolant and secondly a mixture of coolant and a hot-gas stream can arise.

To fasten the sheet metal strips 30 to the sealing element 16, the latter is provided with two parallel slots 40, through which the sheet metal strip 30 which has already been pre-bent in a U shape is inserted. That end 41 of the sheet metal strip 30 which lies opposite the tip 34 is already bent into the position shown in FIG. 2 for fastening the sheet metal strip 30 before the sealing element 16 is mounted on the rotor disk 19.

After the rotor blades 14 have been mounted in the rotor disks 19, the sealing elements 16 together with the pre-assembled sheet metal strips 30 are threaded in succession into the endlessly encompassing groove 20 arranged on the rotor disk 19 and into the securing groove 24 arranged on the underside 26 of the platform 28. The sealing elements 16 are positioned along the circumference of the groove 20 in such a way that each sheet metal strip 30 lies opposite a recess 38. Then, the tips 34 of the sheet metal strips 30 are bent into the recesses 38, in order to rule out displacement of the sealing elements 16 in the circumferential direction U.

Outlet holes 58 are provided in an end face 52 of the blade root 54 and in the side surfaces 53 of what are termed claws 56, which form the outer rim of the rotor disk 19 between two directly adjacent retainer grooves 12. As can be seen from FIG. 2, the outlet holes 58 arranged in the blade root 54 are connected to a coolant duct 60, the inflow-side opening 62 of which for feeding a coolant is arranged in the underside 64 of the blade root 54.

During the operation of a gas turbine equipped with such a rotor portion 10, coolant 66 flows through a cooling duct 65 arranged in the rotor disk 19 into the clearance 67 between the blade root underside 64 and the groove base of the retainer groove 12. From there, some of the coolant 66 passes to the opening 62, after which it then enters into the coolant duct 60. On account of the pressure gradient which is present, the coolant 66 then flows out through the outlet holes 58 in the form of impact cooling jets and strikes the sealing element 16 with an impact cooling action.

In order to set the desired pressure gradient, it may be expedient to arrange an element 68 which generates a pressure loss on the underside 64 of the blade root 54 between the opening 62 and the end face 52. Said element can also be in the form of a sealing element.

A spacer element 70 can also be provided on the end face 52 to achieve a defined distance between the end face 52 of the blade root 54 and the sealing element 16.

The supply of cooling air to the outlet holes 58 arranged in the claws 56 can be achieved with the aid of suitable bores (not shown) in the rotor disk 19.

Figure 3:
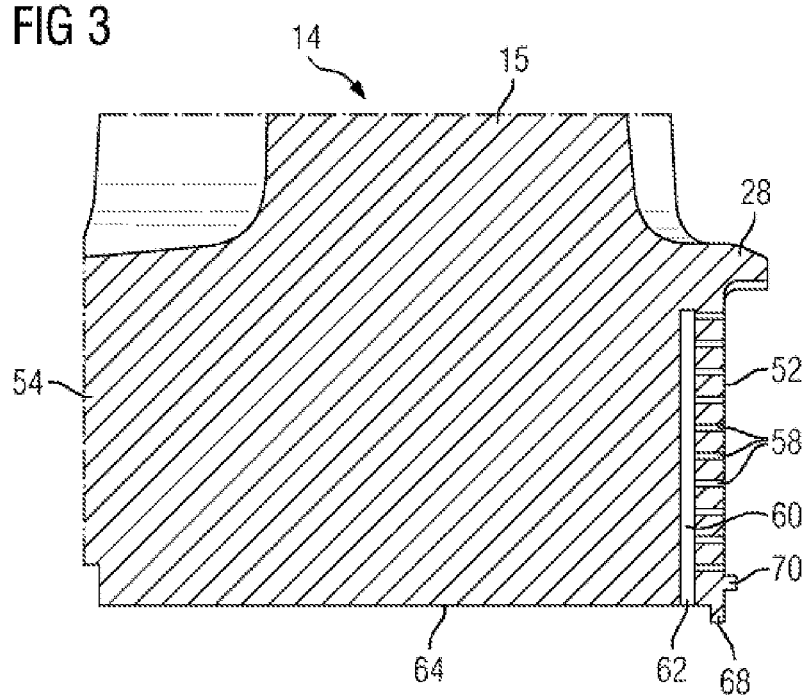
FIG. 3 shows a longitudinal section through the root region of a turbine rotor blade according to the invention.
Figure 4:
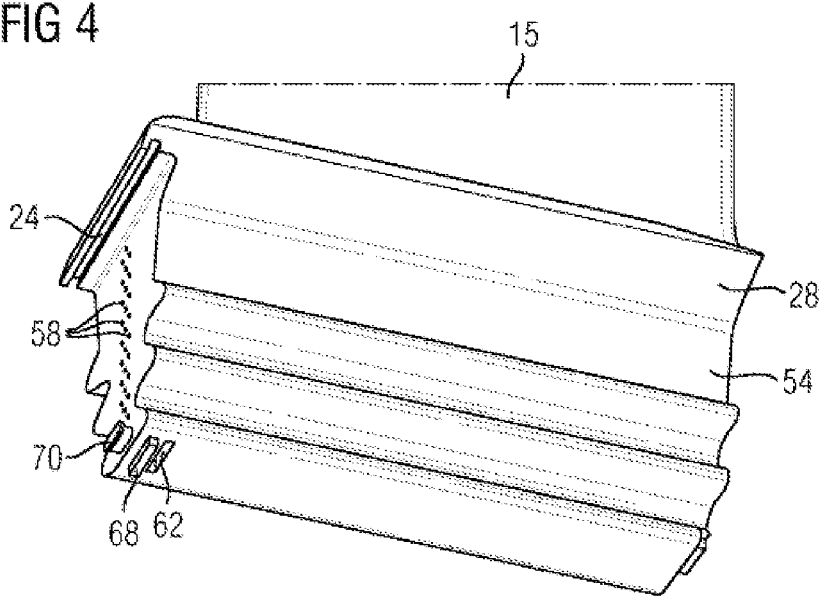
FIG. 4 shows a perspective illustration of the blade root of the turbine rotor blade according to the invention.

FIGS. 3 and 4 show the turbine rotor blade 14 according to the invention comprising the blade root 54, a platform 28 and the main blade part 15 arranged thereon, with the latter only being shown in part, however. The feed opening 62 and the outlet holes 58 are also shown. The distance between the end face 52 of the blade root 54 and the opening 62 is comparatively small, and therefore the coolant duct 60 shown in cross section in FIG. 3 is arranged comparatively close to the end face 52 assigned thereto. The coolant duct 60 extends parallel to the substantially planar end face 52 of the blade root 54.

Overall, the invention therefore relates to a turbine rotor blade 14 having a blade root 54, an adjoining platform 28 and a main blade part 15 located on that side of the platform 28 which is remote from the blade root 54, wherein at least one opening 62 for feeding a coolant 66 into the interior of the turbine rotor blade is provided on an underside 64 of the blade root 54 and merges into a coolant duct 60. The invention also relates to an axial rotor portion 10 for a rotor 23 of a turbine, having an outer circumferential surface which adjoins two first side surfaces 53 at the end and in which rotor blade retainer grooves 12 distributed over the circumference and extending along an axial direction are provided for rotor blades 14 of the turbine, a turbine rotor blade 14 being arranged in each retainer groove 12, wherein a multiplicity of sealing elements 16 are provided to the side of a side surface 53 of the rotor portion 10 and lie opposite the end faces 52 of the blade roots 54 to form a gap. In order to achieve improved cooling of the sealing element 16, which increases the service life thereof or makes the latter suitable for higher ambient temperatures, it is proposed that a multiplicity of outlet holes 58 for the impact cooling of the sealing elements 16 are provided in the side surface 53 and/or in the end face 52.

The invention claimed is:

1. A turbine rotor blade comprising:
   a blade root, an adjoining platform and a main blade part located on that side of the platform which is remote from the blade root,
   wherein at least one opening for feeding a coolant into the interior of the turbine rotor blade is provided on an underside of the blade root and which merges into a coolant duct, and
   wherein a number of outlet holes for impact cooling of adjacent components are provided in at least one of two end faces of the blade root and open into the coolant duct.

2. The turbine rotor blade as claimed in claim 1, in which the coolant duct is directly adjacent to a respective end face of the blade root.

3. The turbine rotor blade as claimed in claim 1, in which at least one spacer for an abutment of a sealing element is provided on a respective end face.

4. The turbine rotor blade as claimed in claim 1, in which an element which generates a pressure loss for the coolant is arranged on the underside between the at least one opening and a corresponding end face of the two end faces.

5. An axial rotor portion for a rotor of a turbine, comprising:
   an outer circumferential surface which adjoins two first side surfaces of the axial rotor portion and in which rotor blade retainer grooves distributed over the outer circumferential surface and extending along an axial direction are provided for rotor blades of the turbine,
   a turbine rotor blade comprising a blade root arranged in each retainer groove, and
   a multiplicity of sealing elements provided adjacent a side surface of the axial rotor portion and opposite end faces of blade roots to form a gap between the multiplicity of sealing elements and the end faces,
   wherein each turbine rotor blade further comprises an adjoining platform and a main blade part located on that side of the platform which is remote from the blade root,
   wherein at least one opening for feeding a coolant into an interior of a respective turbine rotor blade is provided on an underside of the respective blade root and merges into a respective coolant duct in the respective turbine rotor blade, and
   wherein a number of outlet holes for impact cooling of adjacent components are provided in at least one of the two end faces of each blade root and open into a respective coolant duct.

6. A method for cooling a sealing element of an axial rotor portion as claimed in claim 5, comprising:
   flowing cooling air for impact cooling of the multiplicity of sealing elements out through the number of outlet holes.

* * * * *